(12) United States Patent
Wang et al.

(10) Patent No.: US 10,698,932 B2
(45) Date of Patent: Jun. 30, 2020

(54) METHOD AND APPARATUS FOR PARSING QUERY BASED ON ARTIFICIAL INTELLIGENCE, AND STORAGE MEDIUM

(71) Applicant: BEIJING BAIDU NETCOM SCIENCE AND TECHNOLOGY CO., LTD., Haidian District, Beijing (CN)

(72) Inventors: Shuohuan Wang, Beijing (CN); Yu Sun, Beijing (CN); Dianhai Yu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 203 days.

(21) Appl. No.: 15/990,157

(22) Filed: May 25, 2018

(65) Prior Publication Data

US 2018/0341698 A1 Nov. 29, 2018

(30) Foreign Application Priority Data

May 27, 2017 (CN) .......................... 2017 1 0389780

(51) Int. Cl.
*G06F 16/332* (2019.01)
*G06N 20/00* (2019.01)
(Continued)

(52) U.S. Cl.
CPC ........ *G06F 16/3329* (2019.01); *G06F 40/205* (2020.01); *G06F 40/216* (2020.01);
(Continued)

(58) Field of Classification Search
None
See application file for complete search history.

(56) References Cited

U.S. PATENT DOCUMENTS 10,388,274 B1 * 8/2019 Hoffmeister ...... G06F 16/24522
2014/0324469 A1 10/2014 Reiner
(Continued)

FOREIGN PATENT DOCUMENTS

CN 103534696 A 1/2014
CN 104050256 A 9/2014
(Continued)

OTHER PUBLICATIONS

Chinese Office Action dated Feb. 3, 2020, for related Chinese Appln. No. 201710389780.7; 5 Pages.
(Continued)

*Primary Examiner* — Richa Mishra
(74) *Attorney, Agent, or Firm* — Brooks Kushman PC

(57) ABSTRACT

The present disclosure provides a method and apparatus for parsing a query based on artificial intelligence, and a storage medium, wherein the method comprises: regarding any application domain, obtaining a knowledge library corresponding to the application domain; determining a training query serving as a training language material according to the knowledge library; obtaining a deep query parsing model by training according to the training language material; using the deep query parsing model to parse the user's query to obtain a parsing result. The solution of the present disclosure may be applied to improve the accuracy of the parsing result.

15 Claims, 7 Drawing Sheets

(51) Int. Cl.
*G06F 40/35* (2020.01)
*G06F 40/205* (2020.01)
*G06F 40/216* (2020.01)
*G06F 40/242* (2020.01)
*G06N 3/04* (2006.01)
*G06N 3/08* (2006.01)
*G06N 5/02* (2006.01)
*G06N 7/00* (2006.01)

(52) U.S. Cl.
CPC ............ *G06F 40/242* (2020.01); *G06F 40/35* (2020.01); *G06N 3/0445* (2013.01); *G06N 3/084* (2013.01); *G06N 5/02* (2013.01); *G06N 5/027* (2013.01); *G06N 7/005* (2013.01); *G06N 20/00* (2019.01)

(56) References Cited

U.S. PATENT DOCUMENTS

2017/0364520 A1* 12/2017 Venkataraman ............................ H04N 21/42203
2018/0060301 A1* 3/2018 Li ........................... G06F 40/35

FOREIGN PATENT DOCUMENTS

| CN | 105550190 A | 5/2016 |
| CN | 106407333 A | 2/2017 |

OTHER PUBLICATIONS

Chinese Search Report dated Jan. 16, 2020 for related Chinese Appin. No. 2017103897807; 2 Pages.

* cited by examiner

| |
|---|
| Intent : <Ticket-booking intent> |
| Slot : Start, End, Time, Seat, Type... |
| Intent : <Ticket-querying intent> |
| Slot : Start, End, Time, Seat, Type... |

Fig. 2

| |
|---|
| Train type |
| G-series high-speed train |
| D-series high-speed train |
| Ordinary express |
| Through express |
| ... |
| Ticket type |
| Hard sleeper |
| Soft sleeper |
| Hard seat |
| Standing ticket |
| ... |

Fig. 3

| |
|---|
| <Ticket-booking intent> |
| Help me book a train ticket from <place> to <place> at <time>    Time=<time>_0, Start=<place>_0, End=<place>_1 |
| Help me book a ticket of <train type> to <place> at <time>    Time=<time>_0, End=<place>_0, Type=<train type>_0 |
| Book a train ticket to <place>at<time>, want a ticket of <ticket type> Time=<time>_0, End=<place>_0, seat=<ticket type>_0 |
| I am at <place>, book a train ticket to <place>at<time>    Start=<place>_0, End=<place>_1, Time=<time>_0 |
| ... |
| <Ticket-querying intent> |
| Query for a ticket of < train type> to <place>    End=<place>_0, Type=<train type>_0 |
| Query for a ticket from <place> to <place> at <time>    Start=<place>_0, End=<place>_1, Time=<time>_0 |
| Is there a ticket of <train type> to <place> at <time>    Start=<place>_0, Type=<train type>_0, End=<place>_0 |
| ... |

Fig. 4

| |
|---|
| What about the weather of today? |
| Help me to book a G-series high-speed train ticket to Shanghai tomorrow |
| Book a train ticket to Beijing April 1, soft sleeper |
| Look up for a traffic jam-free route from Xibeiwang to Xierqi |
| Search for the nearest canteen that offers foods not spicy |
| Look for a ticket of the day after tomorrow from Beijing to Tianjin |
| Help me to plan a route to Aquarium |
| ... |

Fig. 5

| Help me to book a G-series high-speed train ticket to Shanghai tomorrow | Ticket-booking intent | Time=tomorrow, End=Shanghai, Type= G-series high-speed train |
|---|---|---|
| Book a train ticket to Beijing April 1, soft sleeper | Ticket-booking intent | Time=April 1, End=Beijing, Seat=soft sleeper |
| Look for a ticket of the day after tomorrow from Beijing to Tianjin | Ticket-querying intent | Start=Beijing, End=Tianjin, Time=the day after tomorrow |
| ... | | |

Fig. 6

METHOD AND APPARATUS FOR PARSING QUERY BASED ON ARTIFICIAL INTELLIGENCE, AND STORAGE MEDIUM

The present application claims the priority of Chinese Patent Application No. 2017103897807, filed on May 27, 2017, with the title of "Method and apparatus for parsing query based on artificial intelligence, and storage medium". The disclosure of the above applications is incorporated herein by reference in its entirety.

FIELD OF THE DISCLOSURE

The present disclosure relates to computer application technologies, and particularly to a method and apparatus for parsing a query based on artificial intelligence, and a storage medium.

BACKGROUND OF THE DISCLOSURE

Artificial intelligence AI is a new technical science for researching and developing theories, methods, technologies and application systems for simulating, extending and expanding human intelligence. Artificial intelligence is a branch of computer sciences and attempts to learn about the essence of intelligence, and produces a new intelligent machine capable of responding in a manner similar to human intelligence. The studies in the field comprise robots, language recognition, image recognition, natural language processing, expert systems and the like.

Natural interaction of a computer and a human being is a kernel issue of artificial intelligence. To enable the machine and the human being to communicate without any hindrance, a problem to be solved first is to enable the machine to understand language spoken by the human being.

At present, human-machine dialog products are applied more and more widely. Different from the query form of search, query in the human-machine dialog products usually appear in the form of speech. This form better complies with human natural expression. However, diversity and complexity of speech expressions increases the machine's difficulty in understanding such type of queries.

In current main human-machine dialog products, a main function is usually is divided into different application domains, for example, booking train tickets is one application domain, and weather query is also an application domain.

A procedure of the machine understanding a spoken query may take the form that given a certain query, the machine needs to parse whether it belongs to a certain application domain, and if yes, needs to provide an intent of the query and parameter information under the intent.

For example, there are two queries: query=help me to book a train ticket from Beijing to Tianjin, and query=I want to go to Tianjin from Beijing by train. The two queries both convey a user's intent to "book a ticket". The parameter information includes: departure: Beijing, and destination: Tianjin.

It can be seen that a key problem in human-machine dialog products is paring the user's query and thereby obtaining an accurate parsing result.

In the prior art, the following parsing manner is usually employed: summarize some cases manually, find fixed templates of these cases, store the templates, and when a query needs to be parsed, match the query with the stored templates, and determine the intent of the query and the parameter information under the intent.

However, speech expression manners are diverse and complicated. The templates needs to be summarized manually and are usually in a limited number. Therefore, the templates can only be used to parse some simpler queries that can be covered by the templates, and cannot correctly parse other queries, i.e., generally speaking, parsing results are less accurate.

SUMMARY OF THE DISCLOSURE

In view of the above, the present disclosure provides a method and apparatus for parsing a query based on artificial intelligence, and a storage medium, which can improve the accuracy of the parsing result.

Specific technical solutions are as follows:

A method for parsing a query based on artificial intelligence, comprising:

regarding any application domain, obtaining a knowledge library corresponding to the application domain;

determining a training query serving as a training language material according to the knowledge library;

obtaining a deep query parsing model by training according to the training language material;

using the deep query parsing model to parse the user's query to obtain a parsing result.

According to a preferred embodiment of the present disclosure, the obtaining the knowledge library corresponding to the application domain comprises:

obtaining a domain schema, a domain dictionary and a domain template of the application field;

obtaining a general-purpose dictionary universal to all application domains;

considering the obtained information as the knowledge library corresponding to the application domain.

According to a preferred embodiment of the present disclosure, the determining a training query serving as a training language material according to the knowledge library comprises:

screening a candidate query repository to select queries matched with the knowledge library and queries not matched with the knowledge library;

considering the selected queries as training queries.

According to a preferred embodiment of the present disclosure, the using the deep query parsing model to parse the user's query to obtain a parsing result comprises:

performing word segmentation processing for the query;

respectively obtaining an embedding representation corresponding to each obtained word;

inputting embedding representations corresponding to respective words into the deep query parsing model to obtain a parsing result of the query;

wherein the parsing result includes whether to belong to the application domain, and if yes, further includes an intent and parameter information under the intent.

According to a preferred embodiment of the present disclosure, the obtaining an embedding representation corresponding to each obtained word comprises:

respectively obtaining a part of speech tag and a domain knowledge tag of the word;

using a word2vec model obtained by pre-training to respectively obtain embedding representations of the word, the part of speech tag of the word and the domain knowledge tag of the word;

joining the three embedding representations, and considering a joining result as the embedding representation corresponding to the word.

According to a preferred embodiment of the present disclosure, a CRF model is used in the deep query parsing model to perform global slot notation, and determine parameter information in the query.

According to a preferred embodiment of the present disclosure, the method further comprises:

storing the query in the candidate query repository;

if an updated knowledge library is obtained, re-screening the training language materials according to the updated knowledge library, and obtaining an updated deep query parsing model obtained by training according to the screened-out training language materials.

An apparatus for parsing a query based on artificial intelligence, comprising a pre-processing unit and a parsing unit;

the pre-processing unit is configured to, regarding any application domain, obtain a knowledge library corresponding to the application domain, determine a training query serving as a training language material according to the knowledge library, and obtain a deep query parsing model by training according to the training language material;

the parsing unit is configured to use the deep query parsing model to parse the user's query to obtain a parsing result.

According to a preferred embodiment of the present disclosure, the pre-processing unit is configured to obtain a domain schema, a domain dictionary and a domain template of the application field, obtain the general-purpose dictionary universal to all application domains, and consider the obtained information as the knowledge library corresponding to the application domain.

According to a preferred embodiment of the present disclosure, the pre-processing unit is configured to screen a candidate query repository to select queries matched with the knowledge library and queries not matched with the knowledge library, and consider the selected queries as training queries.

According to a preferred embodiment of the present disclosure, the parsing unit is configured to perform word segmentation processing for the query, respectively obtain an embedding representation corresponding to each obtained word, and input embedding representations corresponding to respective words into the deep query parsing model to obtain a parsing result of the query;

wherein the parsing result includes whether to belong to the application domain, and if yes, further includes an intent and parameter information under the intent.

According to a preferred embodiment of the present disclosure, the parsing unit, as for each obtained word, respectively obtains a part of speech tag and a domain knowledge tag of the word, uses a word2vec model obtained by pre-training to respectively obtain embedding representations of the word, the part of speech tag of the word and the domain knowledge tag of the word, joins the three embedding representations, and considers a joining result as the embedding representation corresponding to the word.

According to a preferred embodiment of the present disclosure, a CRF model is used in the deep query parsing model to perform global slot notation, and determine parameter information in the query.

According to a preferred embodiment of the present disclosure, the parsing unit is further configured to store the query in the candidate query repository;

the pre-processing unit is further configured to, if an updated knowledge library is obtained, re-screen the training language materials according to an updated knowledge library, and obtain the updated deep query parsing model obtained by training according to the screened-out training language materials.

A computer device, comprising a memory, a processor and a computer program which is stored on the memory and runs on the processor, the processor, upon executing the program, implementing the above-mentioned method.

A computer-readable storage medium on which a computer program is stored, the program, when executed by the processor, implementing the aforesaid method.

As can be seen from the above introduction, the solution of the present disclosure is employed to, regarding any application domain, first obtain the knowledge library corresponding to the application domain, determine a training query serving as a training language material according to the knowledge library, and obtain the deep query parsing model by training according to the training language material, and subsequently use the deep query parsing model to parse the user's query to obtain a desired parsing result. As compared with the prior art, in the solution of the present disclosure, parsing the query by a machine learning method is adapted for queries in various representation manners and improves the accuracy of the parsing result.

BRIEF DESCRIPTION OF DRAWINGS

FIG. 2 is a schematic diagram of a domain schema according to the present disclosure.

FIG. 3 is a schematic diagram of a domain dictionary according to the present disclosure.

FIG. 4 is a schematic diagram of domain templates according to the present disclosure.

FIG. 5 is a schematic diagram of a candidate query repository according to the present disclosure.

FIG. 6 is a schematic diagram of queries which are screened out from the candidate query repository and matched with a knowledge library according to the present disclosure.

DETAILED DESCRIPTION OF PREFERRED EMBODIMENTS

Technical solutions of the present disclosure will be described in more detail in conjunction with figures and embodiments to make technical solutions of the present disclosure clear and more apparent.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

Figure 1:
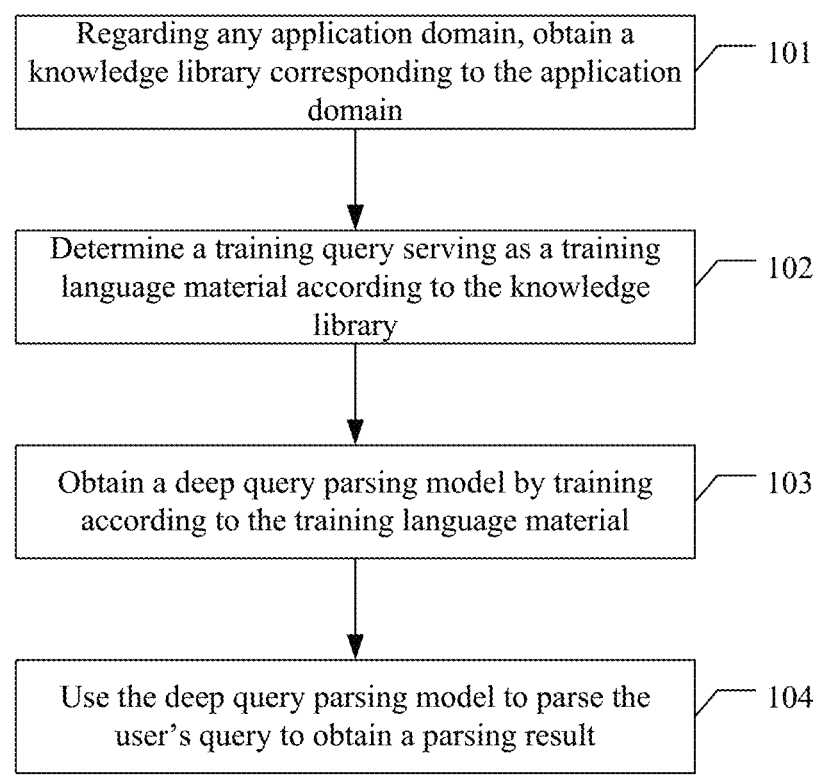
FIG. 1 is a flow chart of an embodiment of a method for parsing a query according to the present disclosure.

FIG. 1 is a flow chart of an embodiment of a method for parsing a query according to the present disclosure. As shown in FIG. 1, the embodiment comprises the following specific implementation mode.

In 101, regarding any application domain, a knowledge library corresponding to the application domain is obtained;

In 102, a training query serving as a training language material is determined according to the knowledge library;

In 103, a deep query parsing model is obtained by training according to the training language material;

In 104, the deep query parsing model is used to parse the user's query to obtain a parsing result.

For ease of depiction, any of the abovementioned application domains is called application domain a.

As can be seen from the above, in the present embodiment, regarding application domain a, it is feasible to first obtain a knowledge library corresponding to the application field a, determine the training query serving as the training language material according to the knowledge library, and train according to the training language material to obtain the deep query parsing model. As such, when the user's query needs to be parsed subsequently, the deep query parsing model may be directly used to parse the query to obtain a desired parsing result.

Specific implementation of the above portions is respectively described in detail.

1) The Deep Query Parsing Model

An application customizer may configure a domain schema, a domain dictionary and a domain template compliant with the application domain a according to experience and domain knowledge.

As shown in FIGS. 2-4, FIG. 2 is a schematic diagram of a domain schema according to the present disclosure, FIG. 3 is a schematic diagram of a domain dictionary according to the present disclosure, and FIG. 4 is a schematic diagram of domain templates according to the present disclosure.

As shown in FIG. 2, the application domain a has two intents: ticket-booking intent and ticket-querying intent. Under each intent, there are parameters such as start, end, time, seat and type.

As shown in FIG. 4, domain templates represent basic forms of queries conforming to the application domain, and represent a slot position therein, for example, "help me book a train ticket from <place> to <place> at <time> (Chinese expression: 帮我订下<时间> <地点>到<地点> 的火车票)", wherein < > indicates the slot position.

As shown in FIG. 3, the domain dictionary includes some words specific to the application domain, for example, G-Series High-Speed Train, D-Series High-Speed Train, and ordinary fast train.

In addition to the domain dictionary, a general-purpose dictionary applicable to all application domains may further be set for different application domains. The general-purpose dictionary includes some words universal for all application domains, for example, time and place. The general-purpose dictionary may also be supplemented by using a named entity recognition technique.

To train the deep query parsing model corresponding to the application domain a, it is first necessary to obtain a knowledge library corresponding to the application domain a, namely, obtain a domain schema, a domain dictionary and a domain template of the application field a, obtain the general-purpose dictionary universal to all application domains, and consider the obtained information as the knowledge library corresponding to the application domain a.

Then, the training query serving as the training language material may be determined according to the knowledge library.

A large number of queries may be accumulated by searching or obtaining from already-existing universal human-machine dialog products and stored in a candidate query repository.

The candidate query repository may be screened to select queries matched with the knowledge library and queries not matched with the knowledge library, and the selected queries are considered as training queries.

A manner of screening to select the queries matched with the knowledge library may be: first, look up the candidate query repository to find the queries matching with domain templates of the application domain a, then, according to the domain dictionary, the domain schema and the general-purpose dictionary of the application domain a, determine whether words in slots in the found query meet slot requirements.

For example, a query is found matched with the domain template "help me book a ticket of <type> to <place> at <time> (Chinese expression: 帮我订下 <时间>去<地 点>的<车次种类>票 )" in FIG. 4. For ease of description, three slots in the domain template are respectively called slot 1, slot 2 and slot 3 in a left-right order. Then, it is feasible to extract the word in slot 1 in the query and determines whether the word is a word of time according to the general-purpose dictionary, and if yes, consider the word in slot 1 as meeting the slot requirement; extract the word in slot 2 in the query, determine whether the word is a word of place according to the general-purpose dictionary, and if yes, consider the word in slot 2 as meeting the slot requirement; extract the word in slot 3 in the query, determine whether the word is a word relating to a type according to the domain dictionary, and if yes, consider the word in slot 3 as meeting the slot requirement; if words in respective slots all meet the slot requirements, consider the query as a query matched with the knowledge library.

The queries not matched with the knowledge library may refer to queries not belonging to the application domain a.

In addition to the above manner of obtaining the training query by screening the candidate query repository, it is further feasible to obtain the training query in some other manners, in actual application, for example, according to the knowledge library, manually construct some queries compliant with the domain templates and domain dictionary in the knowledge library as the training queries.

FIG. 5 is a schematic diagram of a candidate query repository according to the present disclosure. FIG. 6 is a schematic diagram of queries which are screened out from the candidate query repository and matched with the knowledge library according to the present disclosure.

As shown in FIG. 6, regarding each query matched with the knowledge library, the intent of the query and parameter information under the intent may be respectively obtained, for example, query=help me book a G-series high-speed train ticket of tomorrow to Shanghai (Chinese expression: 帮我订下明天 去上海的高铁票 ), wherein the intent is booking a ticket, and parameter information under the intent includes: time: tomorrow, destination: Shanghai, and type: G-series high-speed train.

The candidate queries might include many queries. A certain number of queries may be selected according to actual needs as the training queries.

Then, the deep query parsing model may be obtained by training according to the training queries.

In practical application, many words convey close meaning, for example, words such as "look up", "look for", "position" and "search" convey close meaning in intents such as "look up for a route" and "look up for a place". However, when templates are used, some verbs characterizing intents and attributes are usually seen not sufficiently enough. Upon practical use, these words are often used in the same context. Hence, it is proposed in the present embodiment that embedding representations of words may be pre-trained through a word2vec model. Relatively speaking, this model may make initial embedding representations of these words closer.

Correspondingly, it is feasible, regarding each training query, first perform word segmentation processing for it according to the prior art, and then, with respect to each obtained word, respectively obtain the embedding representation corresponding to the word.

Specifically, as for each obtained word, a part of speech tag and a domain knowledge tag of the word may be obtained respectively. The part of speech tag may include verb, noun and the like. The domain knowledge tag is category/class tag and for example may include time, place and the like and may be determined in conjunction with the domain dictionary and the general-purpose dictionary. Then, it is feasible to use the word2vec model obtained by pre-training to respectively obtain the embedding representations of the word, the part of speech tag of the word and the domain knowledge tag of the word, join the three embedding representations and consider a joining result as the embedding representation corresponding to the word.

It is feasible to, regarding each training query, respectively consider embedding representations corresponding to words in the query as input, consider a parsing result of the training query as output, and then train the deep query parsing model. The parsing result may include two cases: one is not belonging to the application domain a; the other is belonging to the application domain a, the intent and the parameter information under the intent.

The deep query parsing model may be a Bi-LSTM-CRF model.

Figure 7:
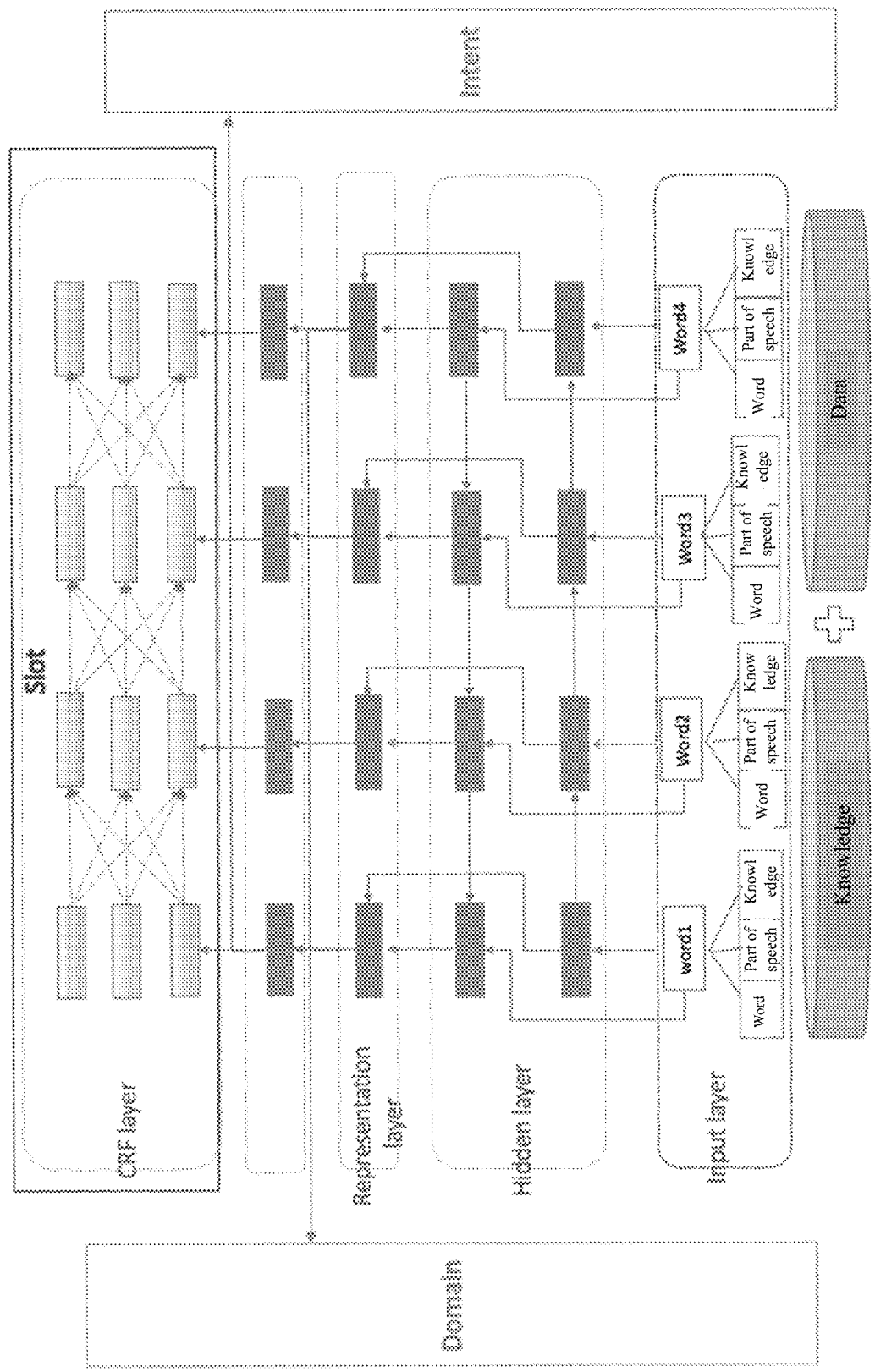
FIG. 7 is a structural schematic diagram of a deep query parsing model according to the present disclosure.

As shown in FIG. 7, FIG. 7 is a structural schematic diagram of a deep query parsing model according to the present disclosure. After the embedding representations corresponding to words in the training query are input into the deep query parsing model, first, pass through a layer of Bi-LST (Bi-Long Short Term Memory Networks) to respectively obtain forward and backward LSTM representations of each word, then join the forward LSTM representation and backward LSTM representation of each word to obtain a representation of each word, then summate representations of all words through a vsum layer, and perform domain recognition according to the summating result. A recognition result includes belonging to application domain a and not belonging to application domain a. In the case of not belonging to the application domain a, subsequent processing is not continued any longer. In the case of belonging to the application domain a, further transformation for example full-connection transformation is respectively performed for representations of respective words, transformation results are summated through a vsum layer, and intent classification is performed according to a summating result, namely, which intent in the application domain a is determined. In addition, a CRF (Conditional Random Field) is introduced in a slot layer to perform global slot notation and thereby determine the parameter information in the query.

Based on the above introduction, how to train according to the training query to obtain the deep query parsing model is of prior art.

After completion of training of each time, a Loss function $L=L_D+L_I+L_S$ may be obtained, $L_D$, $L_I$, $L_S$ respectively represent Loss of domain recognition, Loss of intent classification and Loss of slot notation. It is feasible to, according to a value of the Loss function, adjust model parameter and determine whether to stop training.

During parameter training, it is possible to use a neural network Backpropagation algorithm to calculate gradients of parameters, and use a random gradient descent algorithm. Regarding training data not belonging to the application domain a, $L_I$, $L_S$ may be set as 0 to thereby optimize Loss function $L=L_D+L_I+L_S$.

2) Using the Deep Query Parsing Model to Parse the Query

After the deep query parsing model is obtained by training, the model may be used to parse the user's query.

Specifically, it is feasible to perform word segmentation processing for the query, respectively obtain the embedding representation corresponding to each obtained word, then input embedding representations corresponding to respective words into the deep query parsing model to obtain a parsing result.

The parsing result includes whether to belong to the application domain a, and if yes, further includes an intent and parameter information under the intent.

3) Model Optimization

After the user's query is parsed, the parsing result may be fed back to the user and an application customizer, and the query may be stored in the candidate query repository. Subsequently, the application customizer may, according to parsing situations of the deep query parsing model, determine whether to update the knowledge library, for example, whether to increase new domain templates. If the application customizer updates the knowledge library, it is feasible re-screen the training language materials according to the updated knowledge library, and obtain the updated deep query parsing model obtained by training according to the screened-out training language materials, thereby implementing the optimization of the model.

Figure 8:
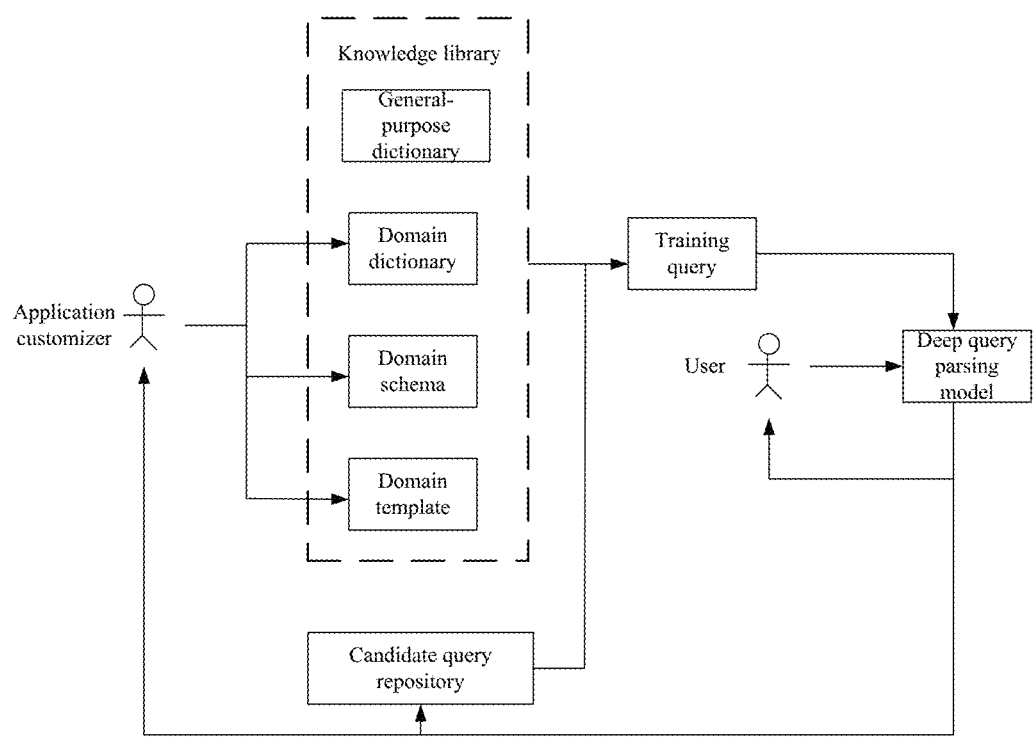
FIG. 8 is an overall structural schematic diagram of a method of parsing a query according to the present disclosure.

To conclude the above introduction, FIG. 8 is an overall structural schematic diagram of a method of parsing a query according to the present disclosure. Specific implementation may be found from the previous relevant depictions and no longer detailed.

In one word, the solution of the above embodiment may be employed to train to obtain the deep query parsing model, namely, parse the query by a machine learning method, thereby adapting to queries in various representation manners and improving the accuracy of the parsing result.

In addition, with the solution of the above embodiment being used, the domain recognition, intent classification and slot notation are merged in one model for completion, thereby reducing cascading errors of the model. Furthermore, a global optimal slot notation effect is achieved by introducing the CRF model.

Again, the solution of the above embodiment may be employed to constantly optimize the model and therefore constantly boost the model effect.

The above introduces the method embodiments. The solution of the present disclosure will be further described through an apparatus embodiment.

Figure 9:
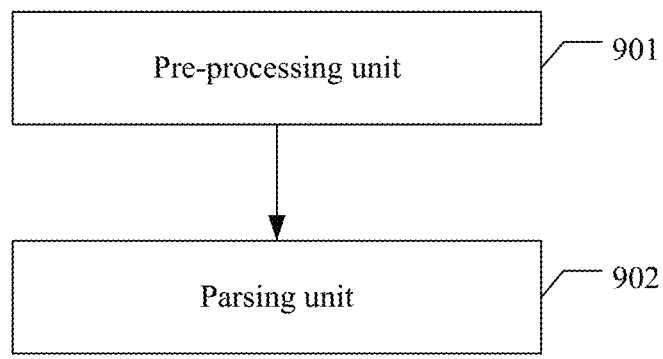
FIG. 9 is a block diagram of an embodiment of an apparatus for parsing a query according to the present disclosure.

FIG. 9 is a block diagram of an embodiment of an apparatus for parsing a query according to the present disclosure. As shown in FIG. 9, the apparatus comprises a pre-processing unit 901 and a parsing unit 902.

The pre-processing unit 901 is configured to, regarding any application domain, obtain a knowledge library corresponding to the application domain, determine a training query serving as a training language material according to the knowledge library, and obtain a deep query parsing model by training according to the training language material.

The parsing unit 902 is configured to use the deep query parsing model to parse the user's query to obtain a parsing result.

For ease of depiction, any of the abovementioned application domains is called application domain a.

An application customizer may configure a domain schema, a domain dictionary and a domain template compliant with the application domain a according to experience and domain knowledge.

The domain schema can be shown in FIG. 2; the field template represents a basic form of the query compliant with the application domain, as shown in FIG. 4; the domain dictionary includes some words specific to the application domain, as shown in FIG. 3.

In addition to the domain dictionary, a general-purpose dictionary applicable to all application domains may further be set for different application domains. The general-purpose dictionary includes some words universal for all application domains, for example, time and place.

Correspondingly, the pre-processing unit 901 is configured to obtain a domain schema, a domain dictionary and a domain template of the application field a, obtain the general-purpose dictionary universal to all application domains, and consider the obtained information as the knowledge library corresponding to the application domain a.

Then, the training query serving as the training language material may be determined according to the knowledge library.

A large number of queries may be accumulated by searching or obtaining from already-existing universal human-machine dialog products and stored in a candidate query repository.

The pre-processing unit 901 is configured to screen the candidate query repository to select queries matched with the knowledge library and queries not matched with the knowledge library, and consider the selected queries as training queries.

The candidate queries might include many queries. A certain number of queries may be selected according to actual needs as the training queries.

Then, the pre-processing unit 901 is configured to obtain the deep query parsing model by training according to the training queries.

It is feasible to, regarding each training query, respectively consider embedding representations corresponding to words in the query as input, consider a parsing result of the training query as output, and then train the deep query parsing model. The parsing result may include two cases: one is not belonging to the application domain a; the other is belonging to the application domain a, the intent and the parameter information under the intent.

The deep query parsing model may be a Bi-LSTM-CRF model.

After the deep query parsing model is obtained by training, the model may be used to parse the user's query.

Specifically, the parsing unit 902 is configured to perform word segmentation processing for the query, respectively obtain the embedding representation corresponding to each obtained word, then input embedding representations corresponding to respective words into the deep query parsing model to obtain a parsing result of the query.

The above manner of obtaining the embedding representation corresponding to each word may be: as for each obtained word, respectively obtain a part of speech tag and a domain knowledge tag of the word, use a word2vec model obtained by pre-training to respectively obtain embedding representations of the word, the part of speech tag of the word and the domain knowledge tag of the word, join the three embedding representations and consider a joining result as the embedding representation corresponding to the word.

In addition, the CRF model may be used in the deep query parsing model to perform global slot notation, and determine parameter information in the query.

The parsing unit 902 may, after using the deep query parsing model to parse the user's query, feed the parsing result back to the user and an application customizer, and store the query in the candidate query repository.

Subsequently, the application customizer may, according to parsing situations of the deep query parsing model, determine whether to update the knowledge library, for example, whether to increase new domain templates. If the application customizer updates the knowledge library, the pre-processing unit 901 may re-screen the training language materials according to the updated knowledge library, and obtain the updated deep query parsing model obtained by training according to the screened-out training language materials, thereby implementing the optimization of the model.

Reference may be made to corresponding depictions in the aforesaid method embodiment for a specific workflow of the apparatus embodiment shown in FIG. 9. The workflow is not detailed any more.

Figure 10:
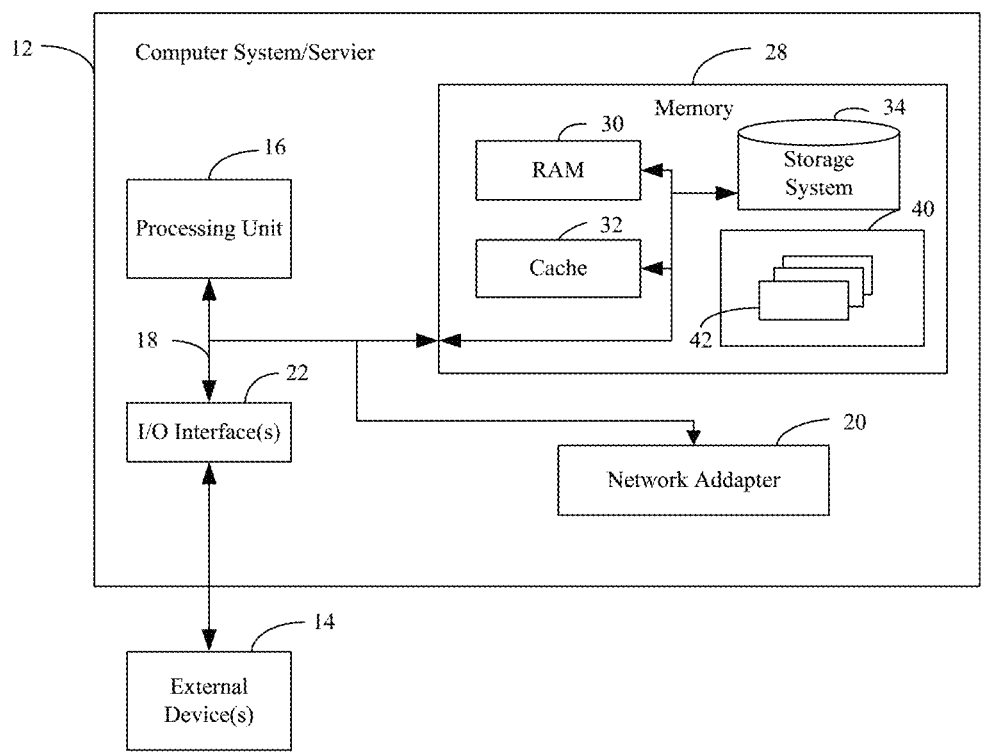
FIG. 10 is illustrates a block diagram of an example computer system/server 12 adapted to implement an implementation mode of the present disclosure.

FIG. 10 illustrates a block diagram of an example computer system/server 12 adapted to implement an implementation mode of the present disclosure. The computer system/server 12 shown in FIG. 10 is only an example and should not bring about any limitation to the function and scope of use of the embodiments of the present disclosure.

As shown in FIG. 10, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 10 and typically called a "hard drive"). Although not shown in FIG. 10, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 10, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiments shown in FIG. 1, namely, regarding any application domain, obtain a knowledge library corresponding to the application domain, determine a training query serving as a training language material according to the knowledge library, obtain a deep query parsing model by training according to the training language material, and use the deep query parsing model to parse the user's query to obtain a parsing result.

Reference may be made to related depictions in the above embodiments for specific implementations, which will not be detailed any more.

The present disclosure meanwhile provides a computer-readable storage medium on which a computer program is stored, the program, when executed by the processor, implementing the method stated in the embodiment shown in FIG. 1.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electro-magnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for parsing a query based on artificial intelligence, wherein the method comprises:
    regarding any application domain, obtaining a knowledge library corresponding to the application domain;
    determining a training query serving as a training language material according to the knowledge library;
    obtaining a deep query parsing model by training according to the training language material;
    using the deep query parsing model to parse the user's query to obtain a parsing result,
    wherein the using the deep query parsing model to parse the user's query to obtain a parsing result comprises:
    performing word segmentation processing for the query;
    respectively obtaining an embedding representation corresponding to each obtained word;
    inputting embedding representations corresponding to respective words into the deep query parsing model to obtain a parsing result of the query;
    wherein the parsing result includes whether to belong to the application domain, and if yes, further includes an intent and parameter information under the intent,
    and wherein the obtaining an embedding representation corresponding to each obtained word comprises:
    respectively obtaining a part of speech tag and a domain knowledge tag of the word;
    using a word2vec model obtained by pre-training to respectively obtain embedding representations of the word, the part of speech tag of the word and the domain knowledge tag of the word,
    joining the three embedding representations together, and considering a joining result as the embedding representation corresponding to the word.

2. The method according to claim 1, wherein
the obtaining a knowledge library corresponding to the application domain comprises:
    obtaining a domain schema, a domain dictionary and a domain template of the application field;
    obtaining a general-purpose dictionary universal to all application domains;
    considering the obtained information as the knowledge library corresponding to the application domain.

3. The method according to claim 1, wherein
the determining a training query serving as a training language material according to the knowledge library comprises:
    screening a candidate query repository to select queries matched with the knowledge library and queries not matched with the knowledge library;
    considering the selected queries as training queries.

4. The method according to claim 1, wherein
a CRF model is used in the deep query parsing model to perform global slot notation, and determine parameter information in the query.

5. The method according to claim 3, wherein
the method further comprises:
    storing the query in the candidate query repository;
    if an updated knowledge library is obtained, re-screening the training language materials according to the updated knowledge library, and obtaining an updated deep query parsing model obtained by training according to the screened-out training language materials.

6. A computer device, comprising a memory, a processor and a computer program which is stored on the memory and runs on the processor, wherein the processor, upon executing the program, implements the following operation:
    regarding any application domain, obtaining a knowledge library corresponding to the application domain;
    determining a training query serving as a training language material according to the knowledge library;
    obtaining a deep query parsing model by training according to the training language material;
    using the deep query parsing model to parse the user's query to obtain a parsing result,
    wherein the using the deep query parsing model to parse the user's query to obtain a parsing result comprises:
    performing word segmentation processing for the query;
    respectively obtaining an embedding representation corresponding to each obtained word;
    inputting embedding representations corresponding to respective words into the deep query parsing model to obtain a parsing result of the query;
    wherein the parsing result includes whether to belong to the application domain, and if yes, further includes an intent and parameter information under the intent,
    and wherein the obtaining an embedding representation corresponding to each obtained word comprises:
    respectively obtaining a part of speech tag and a domain knowledge tag of the word;
    using a word2vec model obtained by pre-training to respectively obtain embedding representations of the word, the part of speech tag of the word and the domain knowledge tag of the word;
    joining the three embedding representations together, and considering a joining result as the embedding representation corresponding to the word.

7. The computer device according to claim 6, wherein
the obtaining a knowledge library corresponding to the application domain comprises:
    obtaining a domain schema, a domain dictionary and a domain template of the application field;
    obtaining a general-purpose dictionary universal to all application domains;
    considering the obtained information as the knowledge library corresponding to the application domain.

8. The computer device according to claim 6, wherein
the determining a training query serving as a training language material according to the knowledge library comprises:
    screening a candidate query repository to select queries matched with the knowledge library and queries not matched with the knowledge library;
    considering the selected queries as training queries.

9. The computer device according to claim 6, wherein
a CRF model is used in the deep query parsing model to perform global slot notation, and determine parameter information in the query.

10. The computer device according to claim 8, wherein the operation further comprises:
storing the query in the candidate query repository;
if an updated knowledge library is obtained, re-screening the training language materials according to the updated knowledge library, and obtaining an updated deep query parsing model obtained by training according to the screened-out training language materials.

11. A computer-readable storage medium on which a computer program is stored, wherein the program, when executed by a processor, implements the following operation:
regarding any application domain, obtaining a knowledge library corresponding to the application domain;
determining a training query serving as a training language material according to the knowledge library;
obtaining a deep query parsing model by training according to the training language material;
using the deep query parsing model to parse the user's query to obtain a parsing result,
wherein the using the deep query parsing model to parse the user's query to obtain a parsing result comprises:
performing word segmentation processing for the query;
respectively obtaining an embedding representation corresponding to each obtained word;
inputting embedding representations corresponding to respective words into the deep query parsing model to obtain a parsing result of the query;
wherein the parsing result includes whether to belong to the application domain, and if yes, further includes an intent and parameter information under the intent,
and wherein the obtaining an embedding representation corresponding to each obtained word comprises:
respectively obtaining a part of speech tag and a domain knowledge tag of the word;
using a word2vec model obtained by pre-training to respectively obtain embedding representations of the word, the part of speech tag of the word and the domain knowledge tag of the word;
joining the three embedding representations together, and considering a joining result as the embedding representation corresponding to the word.

12. The computer-readable storage medium according to claim 11, wherein
the obtaining a knowledge library corresponding to the application domain comprises:
obtaining a domain schema, a domain dictionary and a domain template of the application field;
obtaining a general-purpose dictionary universal to all application domains;
considering the obtained information as the knowledge library corresponding to the application domain.

13. The computer-readable storage medium according to claim 11, wherein
the determining a training query serving as a training language material according to the knowledge library comprises:
screening a candidate query repository to select queries matched with the knowledge library and queries not matched with the knowledge library;
considering the selected queries as training queries.

14. The computer-readable storage medium according to claim 11, wherein
a CRF model is used in the deep query parsing model to perform global slot notation, and determine parameter information in the query.

15. The computer-readable storage medium according to claim 13, wherein
the operation further comprises:
storing the query in the candidate query repository;
if an updated knowledge library is obtained, re-screening the training language materials according to the updated knowledge library, and obtaining an updated deep query parsing model obtained by training according to the screened-out training language materials.

* * * * *